United States Patent [19]

Ellison et al.

[11] Patent Number: 5,072,884

[45] Date of Patent: Dec. 17, 1991

[54] ELLIPTICAL TANK PORTABLE GARDEN SPRAYER

[75] Inventors: Garry L. Ellison; Kim W. Sears, Middleville, both of Mich.

[73] Assignee: Root-Lowell Corporation, Lowell, Mich.

[21] Appl. No.: 622,376

[22] Filed: Dec. 5, 1990

Related U.S. Application Data

[63] Continuation of Ser. No. 392,718, Aug. 11, 1989, abandoned.

[51] Int. Cl.⁵ .............................................. B05B 9/04
[52] U.S. Cl. ................... 239/373; 215/1 C; 220/674; 220/675; 222/401; 239/152
[58] Field of Search ............... 239/373, 152, 153, 154; 222/158, 401; 215/1 C, 100 A; 220/674, 675, 669

[56] References Cited

U.S. PATENT DOCUMENTS

| | | | |
|---|---|---|---|
| 982,140 | 1/1911 | Keighley | 239/373 |
| 1,295,420 | 2/1919 | Brandt | 239/373 |
| 1,698,690 | 1/1929 | Brandt | 239/373 |
| 2,082,146 | 6/1937 | Brandt | 239/373 |
| 2,853,212 | 9/1958 | Anderson | 239/373 |
| 4,355,728 | 10/1981 | Yoshino et al. | 220/90 |
| 4,380,306 | 4/1983 | Knopf | 220/70 |
| 4,782,982 | 11/1988 | Ellison | 239/373 |
| 4,787,560 | 11/1988 | De Yoreo | 239/373 |
| 4,890,752 | 1/1990 | Ota et al. | 215/100 A |
| 4,919,311 | 4/1990 | Born | 222/401 |

FOREIGN PATENT DOCUMENTS

| | | | |
|---|---|---|---|
| 402761 | 3/1924 | Fed. Rep. of Germany | 239/373 |
| 2421212 | 11/1975 | Fed. Rep. of Germany | 215/1 C |
| 590345 | 3/1925 | France | 222/158 |
| 1413545 | 11/1964 | France | 215/1 C |
| 67111 | 1/1951 | Netherlands | 239/152 |

*Primary Examiner*—Andres Kashnikow
*Attorney, Agent, or Firm*—Price, Heneveld, Cooper, DeWitt & Litton

[57] ABSTRACT

A tank for use with a portable sprayer. The tank is made of plastic and is elliptical in shape to provide increased strength for the tank when pressurized. The elliptical configuration also makes less visible the harmless distortions which tend to occur in plastic tanks when pressurized.

24 Claims, 1 Drawing Sheet

ELLIPTICAL TANK PORTABLE GARDEN SPRAYER

This is a continuation of co-pending application Ser. No. 07/392,718 filed on Aug. 11, 1989, now abandoned.

BACKGROUND OF THE INVENTION

In the past, it was common practice to make the tank for a portable garden sprayer out of steel. Such tanks, while useful for their intended purpose, developed a bad reputation due to catastrophic failures under pressure. All too often, the gardener would overpressurize a tank particularly an older tank which may have been rusted or corroded from use only to have the tank rupture spraying the contents of the tank over the gardener and also propelling the tank through the air toward or away from the gardener as a liquid-propelled rocket.

Today, the steel tanks for portable garden sprayers have been replaced by less expensive molded plastic materials. A reputable manufacturer of a garden sprayer would design the tank to withstand the pressure anticipated in proper useage. When the tank is pressurized by the gardener in a perfectly safe manner, many of these plastic tanks tend to harmlessly develop distortions in the surface which, in view of the bad reputation of the prior metal tanks, tend to alarm the gardener unnecessarily or tend to make the gardener believe he has bought a poor quality or defective tank.

SUMMARY OF THE INVENTION

In accordance with the present invention, an elliptical tank has been developed for use with portable garden sprayers. An elliptical tank by its design is stronger than a cylindrical tank with a flat top. While in use, the elliptical tank may develop a harmless distortion due to the pressure applied by the gardener. However, the shape of the tank tends to minimize if not mask the distortion. When a conventional cylindrical tank is used, the tank would normally have a relatively flat top surface along with two parallel lines defining its vertical sides either one of which can serve as a reference plane to exaggerate a harmless distortion of the tank when it is pressurized. Also, if the top tends to bulge in a harmless manner, the inlet or outlet of the tank can become skewed relative to the flat surface which is also immediately apparent. In contrast, the elliptical tank provides no ready frame of reference for the eye. If the tank tends to bulge slightly on pressurization, the bulge would be very difficult to observe since the basic elliptical shape tends to appear bulged.

The tank for a portable sprayer of the present invention has a one-piece elliptical configuration. An internally threaded inlet port is provided on the top of the tank for receiving a pressurizing pump. An externally threaded outlet is provided on the tank for the attachment of a suitable hose and valve wand dispensing system. The tank also has a plurality of spaced feet formed on its bottom to support the tank in a vertical configuration. When used on a portable garden-type sprayer, an improved sprayer is obtained having a stronger tank and a tank which tends to mask harmless distortions not only providing the user with a safer stronger tank but with a feeling of safety or comfort when using the tank.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE PREFERRED EMBODIMENT

Figure 1:
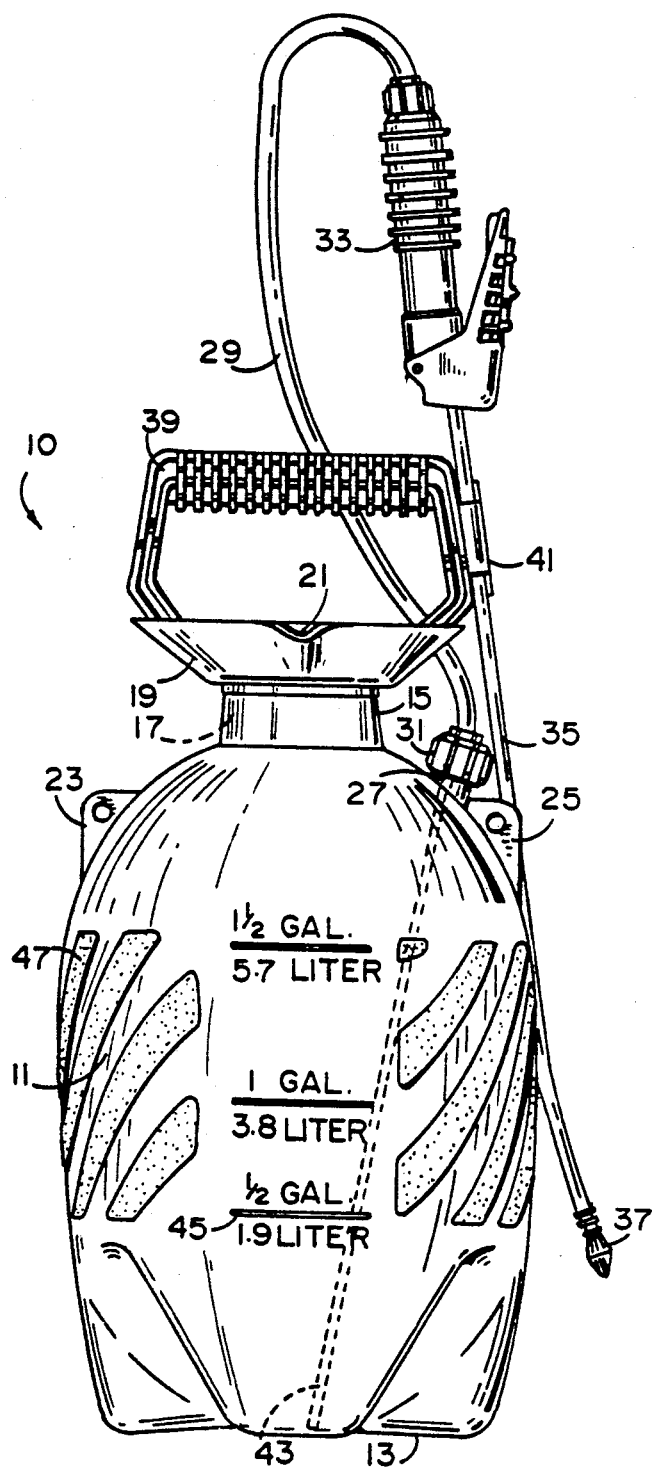
FIG. 1 is an elevational view of a portable sprayer incorporating the elliptical tank.

The improved tank and garden sprayer of the present invention is shown in FIG. 1 and referred to generally by the number 10. The tank can be made from many different types of polymeric materials such as polyethylene and polypropylene. In the preferred embodiment, the tank is made from high density polyethylene. It is recommended that one tenth per cent (0.1%) by weight of an ultraviolet inhibitor be incorporated in the plastic composition used to manufacture the tank.

The tank 11 is of an elliptical configuration and is preferably made by the conventional blow molding technique. The tank has a rounded upper portion instead of the conventional flat portion found on cylindrical tanks. The only portion of the tank which is flat is the bottom of the feet 13 upon which the tank rests. Centrally located in the top portion of the tank 11 is an internally threaded inlet 15 into which the hand pump 17 is threadedly positioned. A funnel 19, also made of high density polyethylene, having a spout 21 surrounds the top of the inlet 15. Approximately equally spaced on either side of the inlet 15 are mounted a pair of eyelets 23 and 25 to which a suitable shoulder strap, not shown, can be attached to facilitate carrying the sprayer. An externally threaded outlet 27 is provided on the top of the tank to which is attached a flexible hose 29 by means of a threaded collar 31. The flexible hose is attached to a hand grip and valve assembly 33 which controls the flow of material from the tank through a dispensing wand 35 and a spray nozzle 37. The wand 35 is attached to the hand pump handle 39 by a pair of pressure deformable jaws 41 molded on the side of the handle. A siphon 4 extends from the outlet 27 to the bottom portion of the tank 11 and is used to carry the pressurized material up from the bottom of the tank into the hose 29.

The tank 11 is translucent so that the level of the liquid contained within the tank can be seen. The tank is provided with graduations 45 marked in both English and metric units to facilitate the mixing of solutions within the tank. The outer surface of the tank has a texturized pattern 47 raised on the surface to assist the gripping of the tank in mixing of chemicals or in pouring the contents of the tank out through the spout 21.

The tank can be made in many different sizes to fit different applications. Since it is intended to be a portable tank, the upper capacity limit would appear to be determined by the overall weight of tank and liquid. For most applications, a smaller tank would be suitable; and the one gallon and one and one-half gallon sizes are preferred. The one and one-half gallon tank is approximately fourteen and one-half inches high to the top of the funnel and approximately seven and one-half inches at its maximum diameter.

The wall thickness of the tank can also be varied. The tank should be designed to safely contain sufficient pressure for the liquid to be properly dispensed from the spray nozzle on the wand. If the walls are too thick, the additional material merely adds to the weight of the tank while serving no other useful purpose. A tank with a wall thickness of approximately 0.125 inch is preferred for most applications.

Figure 2:
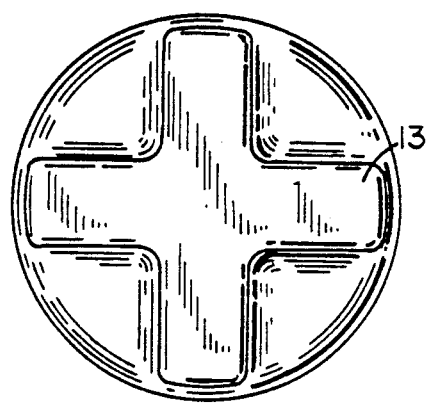
FIG. 2 is a bottom, plan view illustrating the supporting feet formed in the tank.
Figure 3:
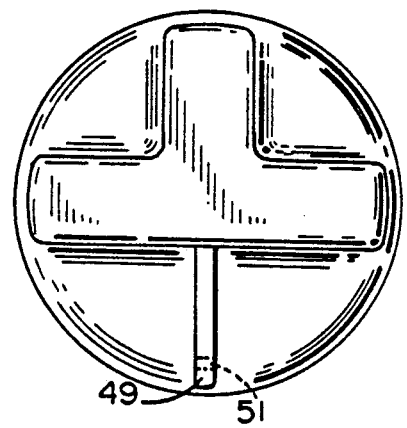
FIG. 3 is a bottom view showing a modified support plan with a solid foot with an aperture therein for connection to a shoulder strap.

Referring to FIG. 2, the formed feet 13 are symmetrically spaced about the bottom of the tank 11 and are formed during the molding process. Each half of the mold used to form the tank 11 has one-half of a plus sign like shape formed therein. When the material is added to the mold and blown, the material shapes itself into the symmetrical plus sign flat bottom for supporting the tank. Now referring to FIG. 3, the bottom pattern has been changed in that one of the feet has been replaced by a solid foot 49 having an aperture 51 therein for a shoulder support strap. The four feet shown in FIG. 3 will again support the tank 11 in a vertical position. However, the tank 11 using the configuration of FIG. 3, can be supported by a strap or rope from eyelets 23 and 25 or at an angle by a strap or rope from either eyelet 23 or 25 to eyelet 51 in foot 49. Using the latter support configuration, the tank can be conveniently suspended at an angle either in front of or at the side of the gardener.

From the above description, it can be seen that an improved tank for a utility or garden-type sprayer has been invented along with an improved sprayer incorporating such a tank.

Though the invention has been described with respect to a specific preferred embodiment thereof, many variations and modifications will become apparent to those skilled in the art. It is therefore the intention that the appended claims will be interpreted as broadly as possible in view of the prior art to include all such variations and modifications.

The embodiments of the invention in which an exclusive property or privilege is claimed are defined as follows:

1. A tank for a portable sprayer comprising:
   a one-piece tank having an elliptical sidewall configuration extending substantially entirely from the bottom of said tank to the top of said tank;
   an internally threaded inlet disposed on the top of said tank;
   an externally threaded outlet disposed near the top of said tank; and
   a plurality of spaced supporting surfaces formed on the bottom of said tank.

2. A tank for a portable sprayer as set forth in claim 1 wherein said tank is made of plastic.

3. A tank for a portable sprayer as set forth in claim 1 wherein said tank is made of polyethylene.

4. A tank for a portable sprayer as set forth in claim 1 wherein said tank is translucent.

5. A tank for a portable sprayer as set forth in claim 1 wherein said tank has graduated fluid level indicators.

6. A tank for a portable sprayer as set forth in claim 1 wherein said tank has at least one eyelet disposed on the upper surface thereof for attachment of a carrying device.

7. A tank for a portable sprayer as set forth in claim 1 wherein said tank has at least one perforated foot for attachment of a carrying device.

8. A tank for a portable sprayer as set forth in claim 1 wherein said tank has at least one textured strip disposed on the side.

9. A tank for a portable sprayer as set forth in claim 1 wherein said tank has a pattern of nonslip material on its side.

10. A tank for a portable sprayer as set forth in claim 1 wherein said tank has a diagonal pattern of nonslip material on its side.

11. A tank for a portable sprayer as set forth in claim 1 wherein said tank has a funnel surrounding said internally threaded inlet.

12. A tank for a portable sprayer as set forth in claim 11 wherein said funnel has a pour spout.

13. A portable sprayer comprising:
    a tank having an elliptical sidewall configuration extending substantially entirely from the bottom of said tank to the top of said tank for holding a material to be dispensed;
    a pump for applying pressure to the material in said tank;
    a hose connected to said tank for conveying the material from said tank;
    a valve for controlling the flow of material through said hose; and
    a wand for dispensing the material from said tank.

14. A portable sprayer as set forth in claim 13 wherein said tank is made of plastic.

15. A portable sprayer as set forth in claim 13 wherein said tank is made of polyethylene.

16. A portable sprayer as set forth in claim 13 wherein said tank is translucent.

17. A portable sprayer as set forth in claim 13 wherein said tank has graduated fluid level indicators.

18. A portable sprayer as set forth in claim 13 wherein said tank has at least one eyelet disposed on an upper surface thereof for attachment of a carrying device.

19. A portable sprayer as set forth in claim 13 wherein said tank has at least one perforated foot for attachment of a carrying device.

20. A portable sprayer as set forth in claim 13 wherein said tank has at least one textured strip disposed on the side.

21. A portable sprayer as set forth in claim 13 wherein said tank has a pattern of nonslip material on its side.

22. A portable sprayer as set forth in claim 13 wherein said tank has a diagonal pattern of nonslip material on its side.

23. A portable sprayer as set forth in claim 13 wherein said tank has a funnel surrounding said internally threaded inlet.

24. A portable sprayer as set forth in claim 23 wherein said funnel has a pour spout.

* * * * *